United States Patent

[11] 3,577,714

| [72] | Inventor | Einar S. Dahl |
| | | Galesburg, Ill. |
| [21] | Appl. No. | 853,310 |
| [22] | Filed | Aug. 27, 1969 |
| [45] | Patented | May 4, 1971 |
| [73] | Assignee | Outboard Marine Corporation |
| | | Waukegan, Ill. |
| | | Continuation-in-part of application Ser. No. 649,259, June 27, 1967, now abandoned. |

[54] REAR ROLLER GUARD FOR ROTARY MOWERS
21 Claims, 6 Drawing Figs.

| [52] | U.S. Cl. | 56/17.2, 56/255 |
| [51] | Int. Cl. | A01d 75/20 |
| [50] | Field of Search | 56/25.4, 255, 249 |

[56] References Cited
UNITED STATES PATENTS

| 2,912,813 | 11/1959 | Ellsworth | 56/249 |
| 2,973,613 | 3/1961 | Hagedorn | 56/25.4 |
| 3,106,812 | 10/1963 | McDonagh | 56/25.4 |
| 3,118,268 | 1/1964 | Benz | 56/255 |
| 3,190,061 | 6/1965 | Gilbertson | 56/25.4 |
| 3,402,535 | 9/1968 | Nelson | 56/25.4 |
| 3,432,183 | 3/1969 | Groll | 56/25.4X |

FOREIGN PATENTS

| 926,473 | 5/1963 | Great Britain | 56/249 |
| 930,870 | 7/1963 | Great Britain | 56/255 |
| 1,004,014 | 9/1965 | Great Britain | 56/255 |

*Primary Examiner*—Louis G. Mancene
*Assistant Examiner*—J. A. Oliff
*Attorney*—Wheeler, Wheeler, House & Clemency ABSTRACT: A rear roller guard assembly which prevents ejection of missiles rearwardly from beneath a rotary mower blade housing. The roller guard assembly includes two or more paddle wheels having radially extending vanes which are rotatably supported on an axle which is supported rearwardly of the housing by two sidearms. The sidearms are pivotally connected to the mower housing and extend rearwardly therefrom.

In one embodiment, the paddle wheels are located rearwardly of the rear wheel axle. In a further embodiment, the paddle wheels support the rear of the mower housing above the ground. A shield located over the roller prevents the escape of missiles between the rear edge of the mower housing and the roller.

PATENTED MAY 4 1971

Inventor
Einar S. Dahl
By
Whalen, Whalen, House & Clemency
Attorneys

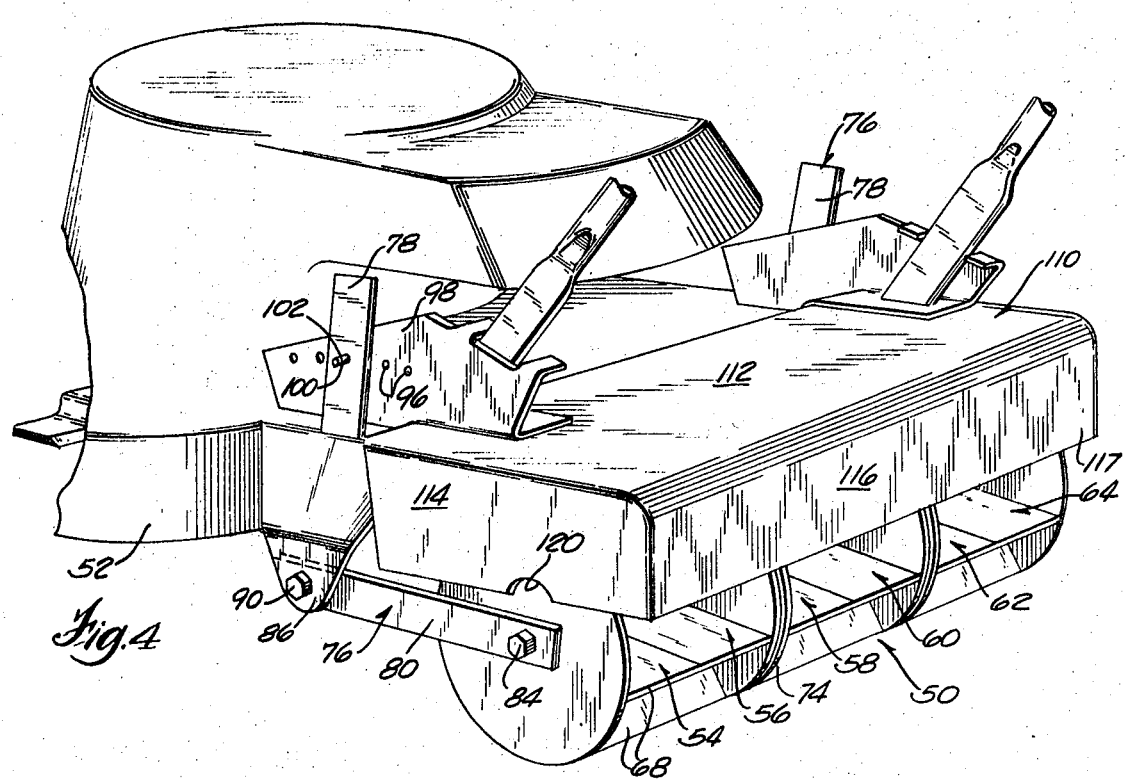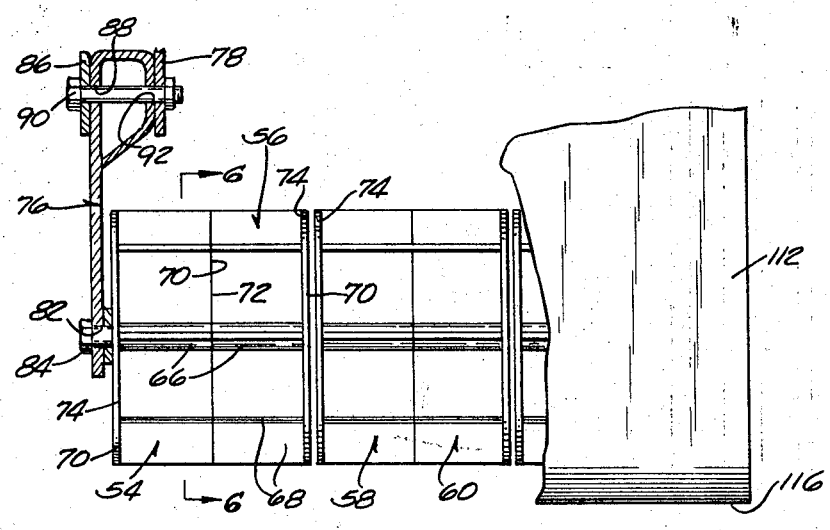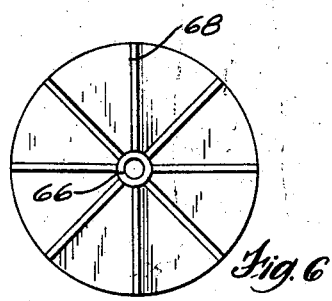

REAR ROLLER GUARD FOR ROTARY MOWERS

CROSS-REFERENCE TO RELATED APPLICATION

The present application is a continuation-in-part of my U.S. Pat. application Ser. No. 649,259 filed June 27, 1967, now abandoned.

BACKGROUND OF INVENTION

Various hazards are present in the operation of conventional rotary lawnmowers in connection with possible impact of the cutting blade with objects such as stones or pebbles which can be impelled at high velocity from beneath the blade housing, endangering the operator and bystanders. Normally, the plane or track of the cutting blade is near the lower edge of the blade housing. In conventional mowers, the clearance between the lower edge of the housing and the ground normally varies between 1 and 3 inches as the mower is adjusted for different depths of cut, making it possible for objects to be thrown out or ejected from under the housing.

When the blade housing is adjusted for a shortcut, the clearance between the housing and the ground is generally close enough to prevent missile escape. However, when the blade housing is raised to change the height of cut, the protection afforded by the housing decreases and accordingly the hazard to the operator and bystanders increases.

Commonly assigned U. S. Pat. applications Ser. Nos. 609,076, now U.S. Pat. No. 3,501,902, and 609,137, now abandoned, and filed as a continuation in patent application Pat. No. 14,713, disclose side guards which afford protection along the side of mowers to prevent ejection of missiles from beneath the mower housing. Commonly assigned U.S. application Ser. No. 619,360 discloses a rotating front guard. The invention disclosed herein provides protection at the rear of the mower and can be utilized in combination with the inventions of the above-identified applications.

SUMMARY OF INVENTION

In one embodiment of the invention, protection is afforded rearwardly of a mower by a roller guard assembly which is located adjacent the rear mower wheels and which presents, in effect, a continuous wall in the clearance area between the lower edge of the housing and the ground. The assembly includes a roller having a series of circumferentially spaced radial vanes extending from a hub which is rotatably supported on a horizontal axle. The vanes have a radial extent outwardly of the hub at least as great as the radial extent of the hub. Preferably, two or more rollers are used to facilitate easy turning or steering of the mower. The radially extending vanes permit the roller to stay close to or on the ground as it rotates without encountering resistance from the grass. The use of radial vanes separated by gaps prevents a stiff stubble from forcing the roller off the ground which would thus provide clearance beneath the roller and minimize the protection for the operator.

In one embodiment, the roller guard assembly also includes a roller support arrangement which provides a floating action for the rollers so as to maintain constant engagement of the rollers with the ground. The roller support arrangement includes an axle and two side links or arms which receive the axle ends and which are pivotally connected to the mower housing. The links are secured together by a tie bar. Pivotal movement of the arms or links is limited by a stop which prevents the roller guard from swinging out of position, as for instance when the mower is raised and carried. The stop comprises a vertical slot in the tie bar and a pin or bolt extending from the mower housing and through the slot.

In a further embodiment of the invention, the roller guard assembly supports the mower housing, and thus rear wheels are not employed. In this embodiment, the rollers are rotatably supported on an axle which has its ends journaled in apertures in the legs of two spaced links or bellcranks. The bellcranks are pivotally connected to the mower housing.

To afford height adjustment of the mower housing to vary the depth of cut, the distance of the rollers from the blade housing can be selectively adjusted by angularly displacing the bellcranks about their pivotal axes and securing the bellcranks at the desired position by pins which are receivable in any one of a series of apertures in upstanding brackets on the blade housing.

To afford additional protection to the mower operator and to prevent the escape of missiles between the rear edge of the mower housing and the roller, the invention provides a roller shield extending rearwardly of the mower housing. The shield has a cavity which partially receives the roller to permit vertical movement or adjustment of the roller.

Further objects and advantages of the invention will become apparent from the following drawings and accompanying description.

DRAWINGS

FIG. 4 is a fragmentary side and end perspective view of a rotary mower embodying the invention.

FIG. 5 is an enlarged fragmentary plan view with portions removed of the mower shown in FIG. 1.

FIG. 6 is a sectional view along line 6–6 of FIG. 5.

DETAILED DESCRIPTION

Figure 1:
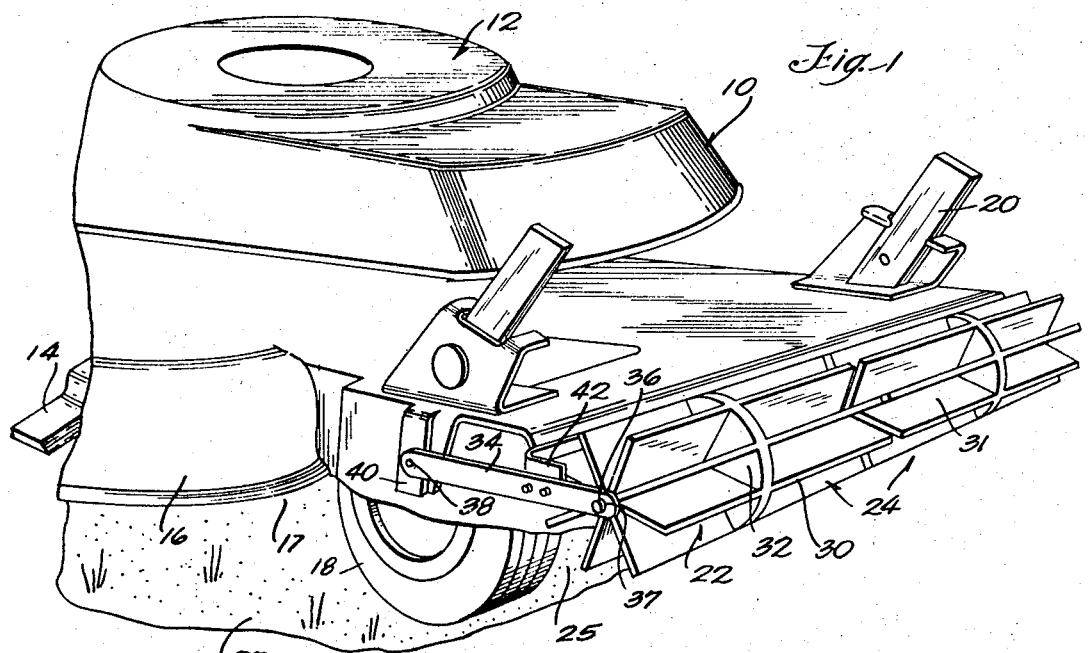
FIG. 1 is a fragmentary side and end perspective view of a rotary mower embodying the invention.

In the drawings, there is shown in FIG. 1 a rotary mower which is generally designated 10 and which includes an engine 12 driving a cutting blade 14. The cutting blade 14 is enclosed by a blade housing 16, which has a lower edge 17. The blade housing is supported for travel in adjacent relation to the ground by rear wheels 18 and front wheels 19. A handle 20 is provided for guiding mower movement.

Figure 2:
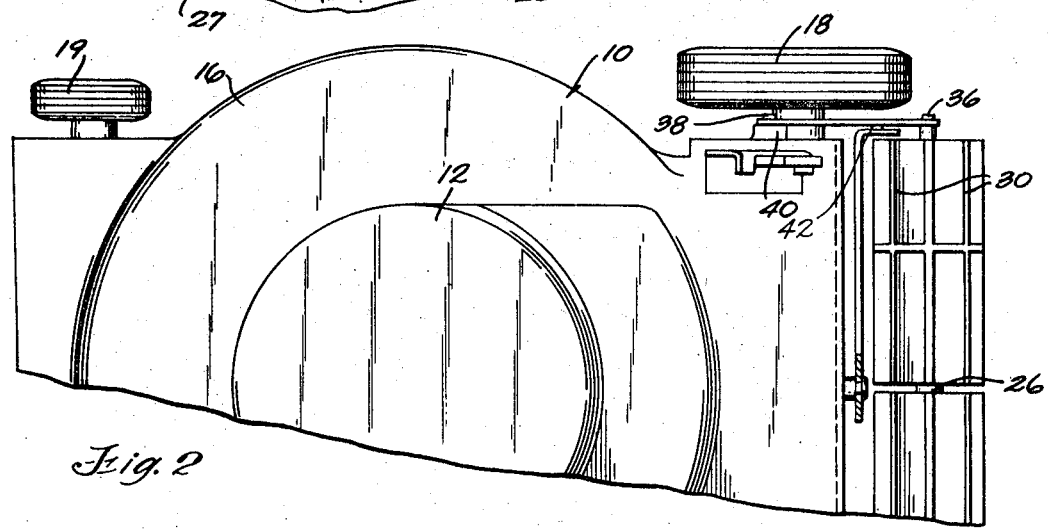
FIG. 2 is a fragmentary plan view of the mower shown in FIG. 1.
Figure 3:
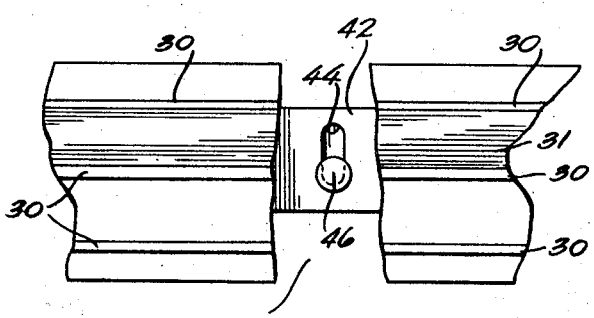
FIG. 3 is an enlarged, partially broken away, fragmentary rear elevational view of the mower shown in FIG. 1.

In accordance with the invention, there is provided a roller guard assembly which is generally designated 22 and which includes two paddle wheels or rollers 24 located rearwardly of the housing 16 and in the clearance zone 25 between the lower edge 17 of the housing and the ground 27. Each roller 24 has a hub 26 as shown in FIG. 2 with a series of circumferentially spaced radially extending rigid vanes 30 with gaps 31 between the vanes. The vanes 30 of each roller extend radially outwardly of the hub for a distance at least as great as the radial extent of the hub and are separated or connected by an intermediate annular disc or partition 32. In the disclosed construction the partition 32 has a radius equal to the radial extent of the vanes 30.

The radial vanes minimize frictional resistance of the grass on the roller and prevent a stiff grass stubble from raising the roller above the ground to increase the clearance beneath the rollers 24 and above the ground 27 which could result in missile escape. The annular partition 32, however, prevents the vanes from dipping or dropping into a depression which can cause resistance or drag on mower movement.

The roller guard assembly includes means for mounting the rollers for rotatable and vertical movement. Such means affords a floating action and enables the rollers to conform to ground relief and maintain, in effect, a continuous wall in the clearance zone 25, with a minimum drag on mower movement. In the disclosed construction, such means includes a pair of links or sidearms 34, each sidearm being located at the outer ends of the rollers 24. Extending through apertures 37 on the ends of the links 34 is an axle 36 which rotatably supports the rollers 24. The arms 34 are pivotally mounted to the blade housing 16 by pins or bolts 38 which extend through depending brackets 40 integral with the housing 16.

In order to maintain the sidearms 34 in the same plane, both sidearms 34 are connected to a tie bar 42 which extends parallel to the axle forwardly of the rollers.

A stop is provided to limit pivotal movement of the sidearms 34 and accordingly, vertical travel of the rollers. In the disclosed construction, the stop comprises in the tie bar 42 a vertical slot 44 with closed ends and a bolt or pin 46 which extends through the slot and is threaded or bolted to the blade housing 16. The slot 44 is of a predetermined length to prevent the roller guard assembly 22 from pivoting out of position when the mower is lifted or raised from the ground. The length of the slot 44 is desirable of sufficient length so that the rollers 24 will contact the ground 27 with the mower blade set in its position of highest cut and can also float when the mower blade is set for lowest cut. The pin 46 will also absorb some of the forces on the rollers rather than transfer them to the side links.

A further embodiment of the invention is disclosed in FIG. 4. In this embodiment, the roller generally designated 50 supports the rear of the blade housing 52 above the ground and rear wheels are not employed. The roller 50 comprises a series of roller sections 54, 56, 58, 60, 62 and 64. Each of the roller sections has a hub 66 (FIG. 6) with angularly spaced radially extending vanes 68 which project outwardly from the hub for a radial distance at least as great as the radial extent of the hub. The vanes have first and second side edges 70 and 72. To facilitate movement along the ground, each roller section has an annular end plate or partition 74 which is connected to the side edges 70 or 72 and which has a radial extent equal to the radial extent of the vanes. Some of the partitions 74 can be located in adjacent relation as shown in FIG. 5 with an annular partition 74 connected to the side edges 72 of roller section 56 and with an annular partition 74 connected to the side edges 70 of roller section 58.

Each of the roller sections 54, 56, 58, 60, 62 and 64 are independently rotatable to minimize resistance to mower movement caused by obstacles on the ground and to facilitate turning or steering of the mower housing. The use of the roller sections to support the rear of the mower housing also eliminates the tracks left in the grass by the use of conventional wheels.

In accordance with the invention, means are provided for rotatably supporting the roller 50, said means also affording selective adjustment of the relation of the roller to the mower housing to vary the depth of cut. In the disclosed construction, the means comprises a pair of spaced arms or bellcranks 76 located on opposite sides of the mower housing. Each bellcrank has a first or upwardly extending leg 78 and a lower horizontally extending second leg 80. The second legs 80 are provided with apertures 82 which receive an axle 84 which rotatably supports the roller. The bellcranks are pivotally connected to brackets 86 which fixedly depend from the mower housing 52. More specifically, the brackets 86 are each provided with an aperture 88 receiving a bolt 90 which extends through apertures 92 in the bellcranks 76.

The height adjustment of the roller is afforded by a series of spaced apertures 96 which are at a common radius from the pivotal axis of the bellcrank and are located in the upstanding brackets 98. The upwardly extending legs of the bellcranks are provided with an aperture 100 and a pin or bolt 102 which extends through aperture 100 into any of the apertures 96.

To increase the protection afforded to the mower operator, and to prevent escape of missiles between the rear edge of the mower housing and above the roller 50, the embodiments of the invention, including the embodiments disclosed in FIGS. 1 and 4, can also include, as shown in FIGS. 5 and 6, a housing portion or roller shield 110. The shield 110 can be formed integrally with the mower housing 52 or can be constructed as a separate unit. The shield 110 includes a top wall 112, spaced sidewalls 114, and a rear wall 116 which merges with the top wall 112. The walls 114, 112, 116 form a cavity 117 which is downwardly open to receive the roller 50 with the ends of the roller received inwardly of the sidewalls 114. Thus, the roller 50 is movable within the shield 110 when the distance of the roller 50 is changed with respect to the mower housing to vary the depth of cut. The sidewalls 114 can be located internally or externally of the bellcranks 76.

The sidewalls can also be provided with downwardly open notches 120 to receive the ends of the axle 84 to afford increased angular displacement of the bellcranks 76 for varying the depth of cut over a larger range.

Various of the features of the invention are set forth in the following claims.

I claim:

1. A lawnmower comprising an engine, a cutting blade driven by said engine, a cutting blade housing supporting said engine, a roller including a hub and a series of angularly spaced vanes extending radially from said hub, said vanes having a radial extent outwardly of said hub at least as great as the radial extent of said hub and being dimensioned to block rearward discharge from said housing when said roller is located adjacent to the rear of said housing, and means for rotatably mounting said roller on said blade housing adjacent the rear thereof.

2. A lawnmower in accordance with claim 1, wherein said vanes form a substantially continuous wall rearwardly of said blade housing.

3. A lawnmower in accordance with claim 1, including a shield located over said roller for substantially the full axial length thereof, said shield including a top wall and a rear wall forming a cavity which receives said roller.

4. A lawnmower in accordance with claim 1, wherein said roller supports said blade housing for travel in adjacent relation to the ground, and said means for mounting said roller on said blade housing includes means for varying the relation of said roller to said blade housing to vary the depth of cut.

5. A lawnmower in accordance with claim 4, wherein said means for mounting said roller on said blade housing and said means for selectively varying the relation of said roller to said blade housing to vary the depth of cut comprises a pair of bellcranks pivotally connected to said blade housing, said bellcranks having first and second legs, apertures in said first and second legs, an axle rotatably carrying said roller, said axle being journaled in said apertures in said second bellcrank legs, brackets on said housing in adjacent relation to said first bellcrank legs, said brackets being provided with a series of spaced apertures at a common radius from the pivotal axis of said bellcranks, and pins extendable through said apertures in said first bellcrank legs and receivable in any of said bracket apertures to maintain said bellcranks at a selected angular displacement with respect to the bellcrank axis.

6. A mower in accordance with claim 1, wherein said vanes have first and second side edges and said first side edges are connected to an annular partition having a radial dimension at least as great as the radial extent of said vanes.

7. A lawnmower in accordance with claim 1, wherein said roller includes a plurality of roller sections, each of said roller sections including said series of vanes, said vanes having first and second side edges, and each of said roller sections having an annular partition connected to one of said first and second side edges.

8. A lawnmower in accordance with claim 1, wherein said roller includes two independently rotatable roller sections, each of said roller sections having an annular partition spaced intermediate the ends thereof.

9. A lawnmower in accordance with claim 1, wherein said roller includes annular partitions at the axially outer ends thereof and having radial dimensions at least as great as the radial extent of said vanes.

10. A lawnmower comprising an engine, a cutting blade driven by said engine, a cutting blade housing supported for travel in adjacent relation to the ground and supporting said engine, a roller located adjacent the rear of said blade housing, said roller including a hub and a series of angularly spaced vanes extending radially from said hub, said vanes having a radial extent outwardly of said hub at least as great as the radial extent of said hub and being dimensioned to block rearward discharge from said housing when said roller is located adjacent to the rear of said housing, and means for rotatably mounting said roller to said blade housing adjacent to the rear thereof to afford rotatable and vertical movement of said roller relative to said housing in response to engagement with the ground.

11. A lawnmower in accordance with claim 10 including a shield located over said roller and including a top wall, sidewalls and an end wall forming a cavity at least partially receiving said roller.

12. A lawnmower in accordance with claim 10, wherein said roller has a radially extending annular partition and said partition has a radius equal to the radial extent of said vanes.

13. A rotary mower in accordance with claim 10 wherein said means for rotatably mounting said roller to said blade housing includes a pair of arms supporting said roller and connected to said housing for pivotal movement relative to said housing, a tie bar connecting said arms and having means for cooperation with said housing for limiting permissible pivotal movement of said arms relative to said housing to a predetermined range.

14. A rotary mower in accordance with claim 13 wherein said pivotal movement limiting means comprises a vertical slot in one of the said tie bar and said housing and a bolt connected to the other of said tie bar and said housing and adapted to be received in said slot so as to limit pivotal movement of said roller relative to said housing.

15. A lawnmower comprising an engine, a cutting blade driven by said engine, a cutting blade housing supporting said engine, a roller including a hub and a series of angularly spaced vanes extending radially from said hub, said vanes having a radial extent outwardly of said hub at least as great as the radial extent of said hub and being dimensioned to block rearward discharge from said housing when said roller is located adjacent to the rear of said housing, means for rotatably mounting said roller on said blade housing adjacent the rear thereof for support of said housing above the ground and including means for varying the relation of said roller to said blade housing to vary the distance of said housing from the ground.

16. A lawnmower in accordance with claim 15 including a housing portion located over said roller, and including a top wall, sidewalls and an end wall forming a cavity at least partially receiving said roller.

17. A lawnmower in accordance with claim 15 wherein said roller has a radially extending annular partition connected to said vanes and wherein said partition has a radius equal to the radial extent of said vanes.

18. A deflecting assembly for a rotary lawnmower including a rotary cutting blade housing, said assembly comprising a pair of arms adapted to be connected to the housing for pivotal movement relative to the housing, and a roller rotatably carried between the outer ends of said arms and including a hub and a series of angularly spaced vanes extending radially from said hub and having a radial extent outwardly of said hub at least as great as the radial extent of said hub, said radial extent of said vanes being of such dimensions as to block rearward discharge from the housing.

19. A deflector assembly in accordance with claim 18 and further including a tie bar connecting said arms and having means for cooperation with the housing for limiting permissible pivotal movement of said arms relative to the housing to a predetermined range.

20. An assembly in accordance with claim 19 wherein said pivotal movement limiting means comprises a vertical slot in said tie bar adapted to be partially occupied by a bolt connected to the housing so as to limit pivotal movement of the assembly relative to the housing.

21. An assembly in accordance with claim 18 wherein said roller has a radially extending annular partition connected to said vanes and wherein said partition has a radius equal to the radial extent of said vanes.